(12) United States Patent
Lee

(10) Patent No.: US 7,132,389 B2
(45) Date of Patent: Nov. 7, 2006

(54) ACID-COATED SAND FOR GRAVEL PACK AND FILTER CAKE CLEAN-UP

(75) Inventor: Li-Jein Lee, Sugarland, TX (US)

(73) Assignee: M-I LLC, Houston, TX (US)

( * ) Notice: Subject to any disclaimer, the term of this patent is extended or adjusted under 35 U.S.C. 154(b) by 0 days.

(21) Appl. No.: 10/858,610

(22) Filed: Jun. 1, 2004

(65) Prior Publication Data

US 2004/0216876 A1    Nov. 4, 2004

Related U.S. Application Data

(62) Division of application No. 10/065,141, filed on Sep. 20, 2002, now Pat. No. 6,817,414.

(51) Int. Cl.
*E21B 43/267* (2006.01)
*C09K 8/80* (2006.01)

(52) U.S. Cl. ............. 507/219; 507/269; 507/901; 507/924; 166/280.2

(58) Field of Classification Search ............. 507/219, 507/269, 901, 924; 166/280.2
See application file for complete search history.

(56) References Cited

U.S. PATENT DOCUMENTS

| | | | | |
|---|---|---|---|---|
| 2,948,638 | A * | 8/1960 | Baird et al. | 428/407 |
| 5,520,250 | A * | 5/1996 | Harry et al. | 166/278 |
| 6,093,492 | A * | 7/2000 | Bredol et al. | 428/403 |
| 6,869,445 | B1 * | 3/2005 | Johnson | 623/17.11 |
| 7,044,220 | B1 * | 5/2006 | Nguyen et al. | 166/280.2 |
| 2002/0114958 | A1 * | 8/2002 | Ozeki et al. | 428/446 |
| 2004/0094300 | A1 * | 5/2004 | Sullivan et al. | 166/308.1 |

FOREIGN PATENT DOCUMENTS

WO    WO 99/30855 A  *  6/1999

\* cited by examiner

*Primary Examiner*—Philip C. Tucker
(74) *Attorney, Agent, or Firm*—Novak Druce & Quigg, LLP

(57) ABSTRACT

A method of the preparation and utilization of polymerized alpha-hydroxycarboxylic-acid-coated proppants for gravel pack and removal of filter cake that was deposited by reservoir drilling fluid. In a preferred example, polyglycolic-acid-coated sand is used to replace conventional gravel pack sand typically used for gravel packing. Under downhole conditions, the acidic by-product generated from the hydration of polyglycolic-acid-coated sand can break down acid-soluble and/or acid-breakable components embedded in the filter cake. This reaction enhances the filter cake removal and the flow of hydrocarbon from the producing formation. The polyglycolic-acid-coated sand may be produced by polymerizing a glycolic acid with a natural or synthetic proppant like 20–40 mesh commercial sand, at temperatures of about 210° F. or higher.

16 Claims, No Drawings

ACID-COATED SAND FOR GRAVEL PACK AND FILTER CAKE CLEAN-UP

CROSS REFERENCE TO RELATED APPLICATIONS

This is a division of U.S. application Ser. No. 10/065,141 filed Sep. 20, 2002 now U.S. Pat. No. 6,817,414 incorporated by reference.

BACKGROUND OF THE INVENTION

To produce oil and gas from hydrocarbon reservoir, a borehole of tapered and often times deviated geometry is first drilled through geological formations. The hydrocarbon-bearing formation then is drilled with a specially designed reservoir drilling fluid, which may comprise various additives, such as starches and calcium carbonate, that are soluble or breakable by acid, oxidizers, or enzymes, or a combination of these chemicals.

Once the desired borehole in the hydrocarbon reservoir is drilled, production tubes and/or screens are run to the bottom of the borehole and placed against the desired formations for hydrocarbon production. Often times, especially when the hydrocarbon-bearing formations consist of poorly cemented sands, some kind of sand control methods or devices are used to prevent sand particles from the formation from entering and plugging up the production screens and tubes in order to extend the life of the well.

One of the typical sand control methods is to fill the annular space between the wellbore and the production screens with specially sized sand, which is usually larger than the formation sand and commonly known as gravel pack sand. The process to place the sized sand behind the production screen is known as a gravel pack operation.

In order to be able to fill the annular space with sand completely and successfully, the hydrocarbon-bearing formation should have been previously covered with a thin layer of firm and impermeable filter cake formed by the reservoir drilling fluid. This thin and impermeable filter cake may prevent the gravel pack fluid from entering the formation, which when occurring at an uncontrollable rate, would result in gravel pack failure.

After the gravel pack sand has been successfully placed, the filter cake existing between the gravel pack sand and the formation needs to be removed before the flow of hydrocarbon is initiated. Without the removal of the filter cake, plugging of the production screen by the filter cake could occur and would result in a production impairment.

To destroy the filter cake that is now behind the gravel pack sand, various chemicals, breakers and mechanical devices have been developed and used. For example, hydrochloric acid is often delivered by a separate operation to soak the gavel pack sand and filter cake with the aid of wash cups. The mechanical wash cups attached to the end of a work string must be picked up at the surface and lowered to the bottom through the inside of the screen. The hydrochloric acid is then pumped through the gravel pack sand repeatedly. The goal of this exercise is to destroy a large amount of the acid-soluble and acid-breakable components in the filter cake.

Other breakers, such as oxidizers and enzymes, may also be delivered to destroy oxidizer- and enzyme-breakable organic components, such as starch polymers. However, these breakers are considered less efficient in several ways. First, they are not effective in destroying acid-soluble and acid-breakable inorganic components in the filter cake, such as calcium carbonate. As a result, acid-soluble and breakable components will remain behind the gravel pack sand and may subsequently cause impairment during the production of the well. Second, many oxidizing breakers have compatibility issues with certain brines. They may react with the brine and create undesirable by-products, such as $Cl_2$ and $Br_2$ gases. This reaction will occur even before the breakers were pumped down to attack the filter cake. Third, in addition to brine compatibility issues, enzyme breakers also have a temperature issue. Most enzyme breakers will lose reactivity in highly concentrated divalent brines, and at temperatures above 200° F.

The above breakers are normally pumped on a separate trip after the gravel pack sand has been set. They are not pumped during the gravel pack operation because they can create precarious conditions for the operation. For instance, the acid-based breakers can destroy the filter cake during gravel pack operation, and consequently result in high fluid loss and premature failure in the gravel pack operation.

Pumping oxidizers and enzyme breakers with gravel pack sand may cause inconsistent application of oxidizers and enzyme breakers to the filter cakes. Since most of the solid oxidizers and enzyme breakers are organic materials with relatively low specific gravity and small particle size, they tend to be pushed toward the screen rather than toward the filter cake where the reaction needs to take place. As a result, the concentration and distribution of these breakers in the gravel pack sand is likely to be erratic, making the filter cake removal less effective.

Microencapsulation is one technique used to deliver wellbore chemicals downhole. The microencapsulation process and application of microencapsulated oil field chemicals, such as scale inhibitors, corrosion inhibitors, surfactants, bactericides, paraffin dispersants, pourpoint modifiers, cement additives, fracture fluid cross linkers, emulsion breaking chemicals, chemical tracers, radioactive tracers, and asphaltene treatment chemicals, using condensation product of hydroxyacetic were disclosed in U.S. Pat. No. 4,986,354. The encapsulated special chemicals are injected along with water into oil wells. Disintegration of the encapsulating polyglycolic polymer in the presence of water allows the encapsulated chemicals to be released to achieve desired reactions.

Microencapsulation of pesticides, insect growth regulators, and other organic compounds in biodegradable polymers from the group consisting of polylactic acid and copolymers of lactic and glycolic acids was disclosed in U.S. Pat. No. 4,272,398.

None of the methods above efficiently deliver the necessary breakers to a filter cake. Thus, there exists an on-going need and desire for breakers which provide a slow release mechanism to initiate the disintegration of filter cakes so that gravel pack operations can be continued.

SUMMARY OF THE INVENTION

The invention is related to the preparation and utilization of polymerized alpha-hydroxycarboxylic acid coated proppants for gravel pack, and the removal of a filter cake that was deposited by reservoir drilling fluid. A preferred example is polyglycolic-acid-coated sand, which is used to directly replace conventional gravel pack sand typically used for gravel packing. Under downhole conditions, the acidic by-product generated from the hydration of polyglycolic-acid-coated sand can break down acid-soluble and/or acid-breakable components embedded in the filter cake. This reaction enhances the filter cake removal and the flow of hydrocarbon from the producing formation.

DESCRIPTION OF ILLUSTRATIVE EMBODIMENTS

The present invention develops a relatively dense breaker that can be used as gravel pack sand and placed evenly across an impermeable filter cake deposited by a reservoir drilling fluid using a conventional gravel pack operation. Under downhole conditions, the breaker product will slowly release an acidic by-product to dissolve or break-down acid-soluble and acid-breakable components in the filter cake. The invention involves the coating of a proppant, such as sized, industrial grade gravel pack sand, with a polymerized alpha-hydroxycarboxylic acid: A preferred polymer is polyglycolic acid which is formed in-situ from monomeric glycolic acid. It should be noted that the polymerized alpha-hydroxycarboxylic-acid-coated proppant may be mixed with a quantity of un-coated proppant, such as conventional gravel pack sand and polyglycolic-acid-coated sand. The breaker-coated sand can be used as gravel pack sand and can be evenly distributed over the filter cake.

Glycolic acid is a member of the alpha-hydroxy acids. The monomers can be polymerized into polymeric forms by condensation polymerization. Self-polymerization can be initiated by heating the monomer to a temperature above the melting point of the polymeric form. The polymeric form of alpha-hydroxy acids, once formed and re-dispersed in water, can slowly hydrolyze and release an acidic by-product. The rate of hydrolysis is affected by temperature. Other alpha-hydroxy acids useful in the invention are malic, lactic, gluconic, citric, mandelic, saccharic, mucic, tartaric and mixtures thereof. Any of the acids above may be mixed with glycolic acid.

Polyglycolic acid polymers are known in the art and described in U.S. Pat. Nos. 3,468,853 and 3,875,937 incorporated herein by reference. The polymeric form of alpha-hydroxy acids made from a condensation process has been used in the medical industries for manufacturing of biodegradable medical articles such as sutures, capsules, etc. A method for production of polyglycolic acid to make medical articles is disclosed in U.S. Pat. No. 6,150,497.

Proppants useful in the invention are any particulate substrate useful for gravel packing. Examples of suitable substrates are natural and synthetic silica sand, glass beads, quartz, ceramics, thermoplastic resin, sintered bauxite, and metal oxides and mixtures thereof.

When a completed well is ready for gravel pack operation, the polyglycolic-acid-coated proppant is added to the gravel pack fluid and pumped downhole to fill the annular space between the production screen and formation in place of the typical gravel pack sand. The gravel pack fluid may consist of water and brines containing various electrolytes and their blends, such as but not limited to NaCl, KCl, $CaCl_2$, $CaBr_2$, $ZnBr_2$, etc.

Under downhole conditions, the polyglycolic acid coating will generate acidic by-products that can react with the acid-soluble and acid-breakable components in the filter cake. Because of the slow release rate of the acidic by-product, it is preferred that the well be shut-in for a given period of time to complete the dissolution and break-down reaction.

The polyglycolic-acid-coated sand can be produced by heating a glycolic acid monomer, such as a 70% technical grade glycolic acid solution, with a natural or synthetic proppant, such as 20–40 mesh commercial sand, at temperatures of about 210° F. or higher until the sand-glycolic acid mixture turns lightly brown, or when the moisture content of the mixture is reduced to less than 5% by weight of dry sand.

Alternatively, the glycolic acid monomer can be pre-heated at a temperature of at least 210° F. until polymerization has started. While maintaining the polyglycolic acid in a liquid form at the above temperature, the proppant can be slowly added and constantly stirred until the ratio of the polyglycolic acid to the proppant is in the range of about 5 to about 20% per dry weight of the proppant, preferably about 8% to about 10%. Employment of other methods of coating the proppant with the polyglycolic acid, such as spray drying, also may be used.

Once the polymerization reaction is completed, the final product is allowed to cool down to room temperature. The product may be lightly ground, using a mortar and pestle or other grinding device, and sieved through a screen, such as a 60-mesh screen, to remove fine particles.

Examples are given below to illustrate the procedures that can be used to prepare polyglycolic-acid-coated sand. However, it should be noted that the production of the polyglycolic-acid-coated sand is not limited to the procedures used by the examples.

The following examples are included to demonstrate preferred embodiments of the invention. It should be appreciated by those of skill in the art that the techniques and compositions disclosed in the examples which follow represent techniques discovered to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

General Information Relevant to the Examples

To evaluate the effects of the polyglycolic-acid-coated sand on filter cake clean up, the test procedure below was used. The test equipment and materials used are considered typical for those who are skilled in the art.

1. A reservoir drilling fluid was first prepared using a given fluid formulation that had been previously selected for a possible field well drilling application.
2. A filter cake was built on a water-saturated ceramic disk having an average 5-micron pore opening size in a double-ended high temperature high pressure fluid loss cell by pressing the reservoir drilling fluid against the ceramic disk with about 300 psi nitrogen differential pressure at about 140° F.–180° F. for approximately 16 hours.
3. After the filter cake had been built, the reservoir drilling fluid inside the cell was decanted and the inside of the cell was rinsed with water to remove the remaining fluid residues.
4. The cell was filled with about 70 mls of a brine to be used for gravel packing. The testing breaker, e.g., the polyglycolic-acid-coated sand or a blend of uncoated gravel pack sand with a chemical breaker, was slowly poured into the brine. No stirring or mixing was performed when adding the breaker.
5. The cell was reassembled, pressurized, and heated to desired temperature to soak the filter cake along with the breaker and gravel pack sand. The drainage valve at the bottom of the cell could be either closed or open depending on the purpose of testing.
6. With the bottom drainage valve open, the soaking brine could flow through the disk as soon as the breaker had reacted with the filter cake and created a communication channel through the filter cake. The time required for this to happen was monitored and measured.

7. With the bottom drainage valve closed, the cell was said to be in a shut-in condition and the soaking brine was not allowed to flow out until a pre-determined soaking time has been reached. The rate at which the brine was drained was monitored to evaluate the efficiency of filter cake clean up.

After the soaking test, the condition of the filter cake inside the cell, such as the amount of residue left on the disk, was visually examined. Permeability of the ceramic disk before or after the soaking also could be measured to evaluate the effectiveness of the removal of filter cake.

EXAMPLE 1

A batch of polyglycolic acid coated sand was prepared using the following ingredients and procedures:

1. A mixture consisting of 380 grams of 20–40 mesh industrial quartz sand from Unimin Corporation and 190 grams of technical grade, 65–70 weight % glycolic acid solution from J. T. Baker was mixed together in a 2-liter crystallizing dish.
2. The dish was placed on a hot plate and heated under a ventilated hood. A temperature of at least 210–220 ° F. was obtained and maintained for about 8–10 hours.
3. The mixture was stirred frequently until the mixture turned into a light-brown colored, somewhat viscous and sticky mixture.
4. When the color of the final mixture changed to light-brown, the heating was terminated.
5. The mixture was cooled to room temperature while stirring. Large aggregates formed during cooling were broken up into individual grains using mortar and pestle.
6. The loose polyglycolic-acid-coated sand grains were sieved through a 60-mesh screen to remove fine-grained, uncoated polyglycolic acid. The sieved polyglycolic-acid-coated sand was used for the filter cake clean up test.

Based on mass balance, the sieved polyglycolic-acid-coated sand contains approximately 13% by weight of polyglycolic acid per dry weight of sand. Although the industrial sand used has a 20–40 mesh size, other sizes of industrial sand can also be used to prepare the polyglycolic-acid-coated sand.

EXAMPLE 2

Using the polyglycolic-acid-coated sand that was previously prepared with the method described in Example 1, and the test procedures described above, the filter cake removal efficiency of the polyglycolic-acid-coated sand was evaluated.

In one test, with the bottom drainage valve left open during soaking, the polyglycolic-acid-coated sand created some pinholes through the filter cake. However, when the valve was left shut-in for 31.5 hours, the filter cake was almost completely destroyed at the end of the soaking with the polyclycolic-acid-coated sand. Return permeability evaluation indicated that the ceramic disk was not severely damaged in terms of fluid conductivity. The test results are given in the following table (Table 1).

TABLE 1

Results of evaluation of polyglycolic-acid-coated sand as a breaker to remove filter cake deposited from a 13.0 ppg $CaBr_2$ based reservoir drilling fluid. The polyglycolic acid content was about 21%.

| Type of Mud to build cake | Breaker | Soaking Time & Temperature | Filter Cake after Soaking | Return Permeability* |
|---|---|---|---|---|
| 13 ppg $CaBr_2$ based Reservoir drilling fluid | ~22 grams PGA coated sand in 13 ppg $CaBr_2$ brine | 4.5 hrs at 180 F. w/Valve Open | Mostly intact with a few pin holes | — |
| 13 ppg $CaBr_2$ based Reservoir drilling fluid | ~22 grams PGA coated sand in 13 ppg $CaBr_2$ brine | 31.5 hrs at 180 F. w/Valve Closed | >90% destroyed | 770 md (5-μ disk) |

*Average initial permeability of 5-micron disk is about 800 md.

EXAMPLE 3

A series of tests were conducted to illustrate the effects of temperature on the filter cake clean up capability of the polyglycolic-acid-coated sand. Filter cakes were built at specific temperatures and then soaked with the polyglycolic-acid-coated sand at the same specific temperatures. The valves were closed during the soaking except at 48 and 72 hours of testing when the valves were opened to drain the soaking brine.

After 48 hours of soaking, none of the cells was able to drain the soaking brine, indicating no effective communication was established through the filter cake. After 72 hours of soaking, the soaking brine was effectively drained; however, there was a difference in the draining rate. Examination of the ceramic disks recovered after the test showed varying amounts of filter cake residues left on the disks, which seems to indicate that the effectiveness of the clean up by polyglycolic-acid-coated sand was temperature dependent. Thus, shut in time required for complete filter cake removal should be adjusted depending on the temperature.

Test results are disclosed in Table 2 below.

TABLE 2

Results of evaluation of polyglycolic-acid-coated sand as a breaker to remove filter cake deposited from a 12.5 ppg CaBr₂ based reservoir drilling fluid. The polyglycolic acid content was about 13%.

| Type of Mud to build cake | Breaker | Soaking Time & Temperature | Filter Cake after Soaking |
|---|---|---|---|
| 12.5 ppg CaBr₂ based Reservoir drilling fluid | 20 grams PGA coated sand in 12.5 ppg CaBr₂ brine | 72 hrs at 140 F. with Valve Closed | ~50% destroyed |
| 12.5 ppg CaBr₂ based Reservoir drilling fluid | 20 grams PGA coated sand in 12.5 ppg CaBr₂ brine | 72 hrs at 160 F. with Valve Closed | ~90% destroyed |
| 12.5 ppg CaBr₂ based Reservoir drilling fluid | 20 grams PGA coated sand in 12.5 ppg CaBr₂ brine | 72 hrs at 180 F. with Valve Closed | >90% destroyed |

EXAMPLE 4

The following table illustrates the generation of acidic components from polyglycolic-acid-coated sand in various fluids as compared with un-coated sand placed in similar fluids, as indicated by pH measurement after each fluid was exposed to 140° F. for 4 days. The concentration of uncoated sand and polyglycolic-acid-coated sand was 10% by weight per volume of the fluid. The use of polyglycolic-acid-coated sand with divalent brines is more beneficial than with freshwater.

TABLE 3

Results of the generation of acidic components of polyglycolic-acid-coated sand in various fluids

|  | Uncoated Sand pH | PGA-coated sand pH |
|---|---|---|
| Freshwater | 9.1 | 2.9 |
| 10 ppg NaCl Brine | 8.1 | 1.6 |
| 12.5 ppg NaBr Brine | 8.3 | 1.6 |
| 11.6 ppg CaCl₂ Brine | 6.1 | <0.1 |
| 14.2 ppg CaBr2 Brine | 4.8 | <0.1 |

While the compositions and methods of this invention have been described in terms of preferred embodiments, it will be apparent to those of skill in the art that variations may be applied to the process described herein without departing from the concept, spirit and scope of the invention. All such similar substitutes and modifications apparent to those skilled in the art are deemed to be within the spirit, scope and concept of the invention as it is set out in the following claims.

What is claimed is:

1. A proppant comprising a particulate substrate coated with an alpha-hydroxycarboxylic acid which has been polymerized, wherein the particulate substrate is selected from natural and synthetic silica sand, glass beads, quartz, thermoplastic resin and sintered bauxite.

2. The proppant of claim 1 wherein the alpha-hydroxycarboxylic acid is selected from glycolic, malic, lactic, gluconic, citric, mandelic, saccharic, mucic, and tartaric acid and mixtures thereof.

3. The proppant of claim 1 wherein the alpha-hydroxycarboxylic acid is glycolic.

4. The proppant of claim 1 wherein the particulate substrate is silica sand and the alpha-hydroxycarboxylic acid is glycolic.

5. The proppant of claim 1 wherein the polymerized alpha-hydroxycarboxylic acid content is about 5% to about 20% by weight per dry weight of the particulate substrate.

6. A proppant comprising a particulate substrate coated with an alpha-hydroxycarboxylic acid which has been polymerized, wherein the polymerized alpha-hydroxycarboxylic acid content is about 8% to about 10% by weight per dry weight of the particulate substrate.

7. A method of making a proppant coated with an alpha-hydroxycarboxylic acid polymer comprising: heating a solution of monomeric alpha-hydroxycarboxylic acid with sized particulate substrate until polymerization of alpha-hydroxycarboxylic acid is completed.

8. The method of claim 7 wherein the monomeric alpha-hydroxycarboxylic acid is selected from glycolic, malic, lactic, gluconic, citric, mandelic, saccharic, mucic, and tartaric acid and mixtures thereof.

9. The method of claim 7 wherein the monomeric alpha-hydroxycarboxylic acid is glycolic acid.

10. The method of claim 7 wherein the particulate substrate is selected from natural and synthetic silica sand, glass beads, quartz, ceramics, thermoplastic resin, sintered bauxite, and metal oxides.

11. The method of claim 7 wherein the completion of polymerization is indicated by a change in the color of the polymerized alpha-hydroxycarboxylic acid/particulate substrate mixture.

12. The method of claim 7 wherein the polymerization is carried out until there is a reduction of moisture content of the said mixture to 5% or less.

13. A method of making a proppant coated with an alpha-hydroxycarboxylic acid polymer comprising: heating a solution of monomeric alpha-hydroxycarboxylic acid with sized particulate substrate until polymerization of alpha-hydroxycarboxylic acid is completed, wherein the polymerization is repeated to form multiple layers of polymerized alpha-hydroxycarboxylic acid on the particulate substrate material.

14. The method of claim 7 wherein the polymerization is carried out at a temperature above about 210° F.

15. A fluid useful for gravel packing a well comprising proppants coated with polymerized alpha-hydroxycarboxylic acid, water, and a salt selected from the group consisting of NaCl, KCl, CaCl₂, CaBr₂ and mixtures thereof.

16. The fluid of claim 15 wherein the proppants are coated with polyglycolic acid.

* * * * *